No. 715,802. Patented Dec. 16, 1902.
W. M. HOLMES.
COMBINED BALE AND TIE.
(Application filed Oct. 10, 1899.)
(No Model.)

Witnesses.
Wm. M. Rheem
Ira D. Perry

Inventor
Watson M. Holmes
by Brown & Darby
Atty's

UNITED STATES PATENT OFFICE.

WATSON M. HOLMES, OF HOOSICK FALLS, NEW YORK, ASSIGNOR, BY MESNE ASSIGNMENTS, TO PLANTERS COMPRESS COMPANY OF MAINE, A CORPORATION OF MAINE.

COMBINED BALE AND TIE.

SPECIFICATION forming part of Letters Patent No. 715,802, dated December 16, 1902.

Application filed October 10, 1899. Serial No. 733,200. (No model.)

*To all whom it may concern:*

Be it known that I, WATSON M. HOLMES, a citizen of the United States, residing at Hoosick Falls, in the county of Rensselaer and State of New York, have invented a new and useful Bale-Tie, of which the following is a specification.

This invention relates to bale-ties.

The object of the invention is to provide means for preventing the endwise expansion of bales of fibrous or other material which are simple, economical, and efficient.

The invention consists, substantially, in the construction, combination, and arrangement, all as will be more fully hereinafter set forth, as shown in the accompanying drawings, and finally pointed out in the appended claims.

Figure 1:
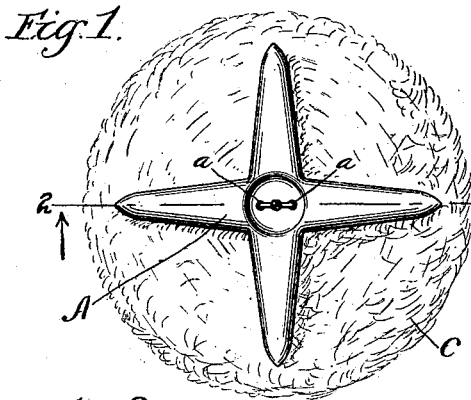
Figure 3:
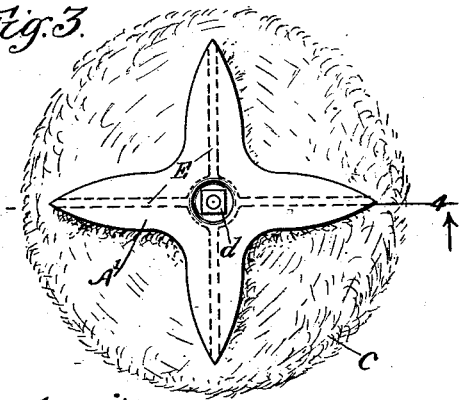
Figure 2:
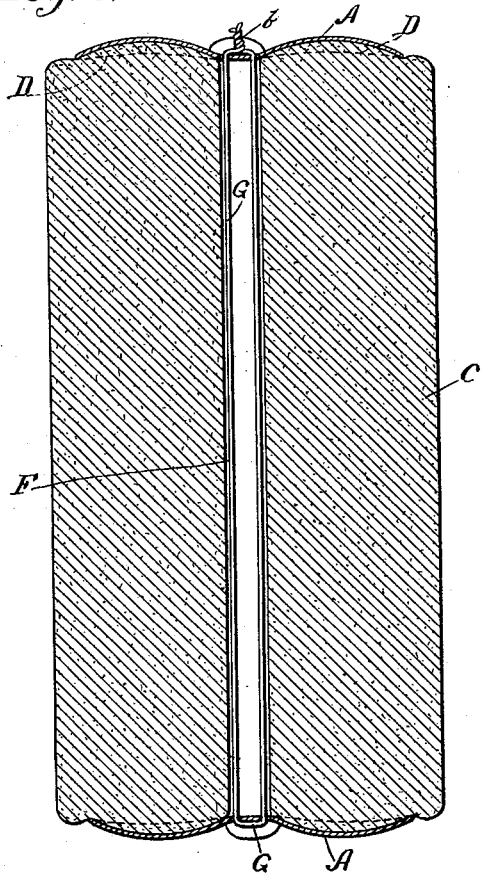
Figure 4:
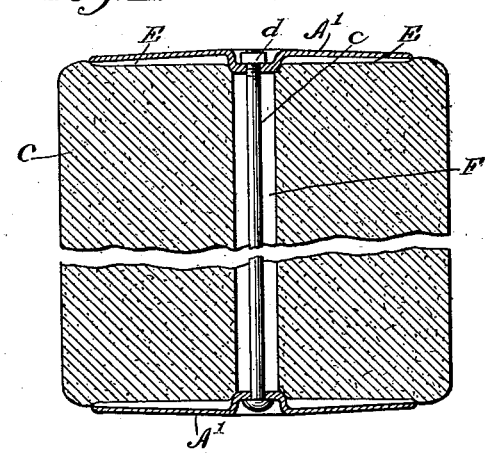
Figure 5:
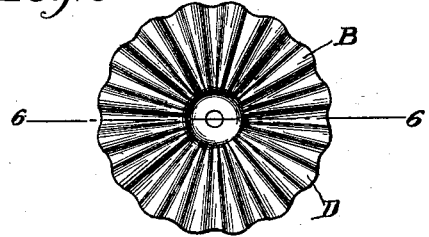
Figure 6:

Referring to the accompanying drawings and to the various views and reference-signs appearing thereon, Figure 1 is an end view of a bale of fibrous material, showing the application thereto of a bale-tie constructed in accordance with the principles of my invention. Fig. 2 is a longitudinal central section of the same on the line 2 2 of Fig. 1. Fig. 3 is a view similar to Fig. 1, showing a modified construction embraced within the scope of my invention. Fig. 4 is a view similar to Fig. 2 on the line 4 4 of Fig. 3. Fig. 5 is a bottom plan view of a modified form of holder or tie plate. Fig. 6 is a section of the same on the line 6 6 of Fig. 5.

In the pending application for patent of George A. Lowry for a bale of fibrous material, Serial No. 621,203, filed January 29, 1897, is shown, described, and claimed a bale of fibrous material built up endwise by superposed continuous spiral layers or convolutions highly compressed and flattened and resting one upon the other, and in Patents Nos. 581,600, 581,601, and 630,369, issued to George A. Lowry, are shown, described, and claimed various constructions of presses for producing such bale.

It has been found that a bale constructed and produced in accordance with the patents above referred to possesses comparatively little tendency to expand radially; but the tendency to expand longitudinally or endwise is very great, and it is the purpose of the present invention to provide a bale stay or tie which is of simple, economical, and efficient construction, whereby the bale is held against and prevented from endwise expansion.

In carrying out the principles of my invention I employ clamping or holding plates arranged to be applied to the ends of the bale and suitably secured or tied together. These clamping or holding plates or ties may be in the form of spiders A A', as shown in Figs. 1 and 2 and in Figs. 3 and 4, or they may be of any other suitable form—as, for instance, in the form of disks, as shown at B, Figs. 5 and 6. Therefore I desire to include by the term "holder or clamping plate" any form of securing device adapted for my purpose, whether in the form of a spider, disk, or any other suitable or convenient form. The holder-plate or clamp may be made of any suitable material—such, for instance, as pressed steel— or may be cast or otherwise suitably formed and, if desired, may be corrugated, as indicated in dotted lines at D, or ribbed, as shown at E, in order to secure the desired strength and rigidity.

In the use of bale-ties embodying the principles of my invention a holder or clamping plate is applied to each end of the bale C to be tied, and then the two plates are suitably secured together. For instance, and in the form shown in Figs. 1 and 2, I may provide two openings or holes *a a* adjacent to the center of the holder or clamping plates and in alinement with the central longitudinal hole or opening F through the bale. A securing or tie wire G may then be passed through said holes or openings *a* and through the longitudinal central hole or opening through the bale and the ends thereof finally twisted or otherwise secured together, as indicated at *b*, Fig. 2, thus tying or holding the plates together, and hence clamping the bale endwise therebetween. It is obvious, however, that the holder or clamping plates may be tied or secured together in many other specifically different ways. For instance, and by way of illustration, I have shown in Figs. 3 and 4 a construction wherein the clamp or holder plates are held together so as to hold the bale endwise therebetween by means of a rod *c*, suitably headed at one end and having a nut $d$, tapped on the other end thereof.

By constructions such as above set forth bales of fibrous or other material constructed in the manner set forth, described, and claimed in the application for patent and in the patents above referred to may be quickly clamped and tied endwise to prevent endwise expansion thereof and in a most simple, efficient, and economical manner.

Having now set forth the object and nature of my invention and forms of construction embodying the principles thereof, what I claim as new and useful and of my own invention, and desire to secure by Letters Patent of the United States, is—

1. The combination with a bale of fibrous or other material capable of endwise expansion and having a central longitudinal orifice or opening therethrough, of sheet-metal spider or holder-plates adapted to be applied to the ends of the bale to secure the same against endwise expansion, and securing devices arranged to pass through the longitudinal central orifice or opening in said bale and connecting said plates together, whereby said bale is held against endwise expansion, as and for the purpose set forth.

2. The combination with a bale of fibrous or other material under endwise compression having a central longitudinal opening, of holder-plates adapted to be applied to the ends of said bale to secure the same against endwise expansion, said holder-plates provided with openings adjacent to the center thereof, and securing devices for said plates arranged to pass through said openings and through the longitudinal central opening in the bale, as and for the purpose set forth.

3. The combination with a bale of fibrous or other material capable of endwise expansion and provided with a longitudinal central opening, spiders or holder-plates adapted to be applied to the ends of said bale to hold the same against endwise expansion, and means connecting said holder-plates to prevent separation thereof under the influence of the endwise expansion of the bale, said means passing through the longitudinal central opening through said bale, as and for the purpose set forth.

In witness whereof I have hereunto set my hand, this 4th day of October, 1899, in the presence of the subscribing witnesses.

WATSON M. HOLMES.

Witnesses:
DANIEL W. HOWLAND,
WM. M. RHEEM.